(12) United States Patent
Rudolph

(10) Patent No.: US 6,230,658 B1
(45) Date of Patent: *May 15, 2001

(54) FREE STALL DIVIDER

(75) Inventor: Joseph L. Rudolph, Wausau, WI (US)

(73) Assignee: Merrill Equipment Company, Merrill, WI (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/375,654

(22) Filed: Aug. 17, 1999

Related U.S. Application Data

(63) Continuation of application No. 09/004,467, filed on Jan. 8, 1998, now Pat. No. 5,975,026.

(51) Int. Cl.$^7$ .................................................. A01K 1/00

(52) U.S. Cl. ................................................ 119/523

(58) Field of Search .................... 119/516, 519, 119/522, 523, 524

(56) References Cited

U.S. PATENT DOCUMENTS

| | | | | |
|---|---|---|---|---|
| 4,590,886 | * | 5/1986 | Brashear | 119/27 |
| 5,069,163 | * | 12/1991 | Moreau et al. | 119/27 |
| 5,111,770 | * | 5/1992 | Weelink | 119/27 |

* cited by examiner

*Primary Examiner*—Thomas Price
(74) *Attorney, Agent, or Firm*—Michael Best & Friedrich LLP

(57) ABSTRACT

A free stall divider which eliminates the need for structural elements in front of each free stall, thereby increasing the space in front of each animal and minimizes the structural elements at the side of each animal thoroughly allowing each animal to position its head comfortably to either side while lying in the stall. The free stall divider comprises a base, at least one mounting member, and at least one dividing element. All of the structural elements required to retain the dividing element upright are mounted to the base. When an animal is in a stall, therefore, all of the mounting members are located to the side of the animal. Therefore, no obstructions prevent the animal from moving in a forward direction.

26 Claims, 12 Drawing Sheets

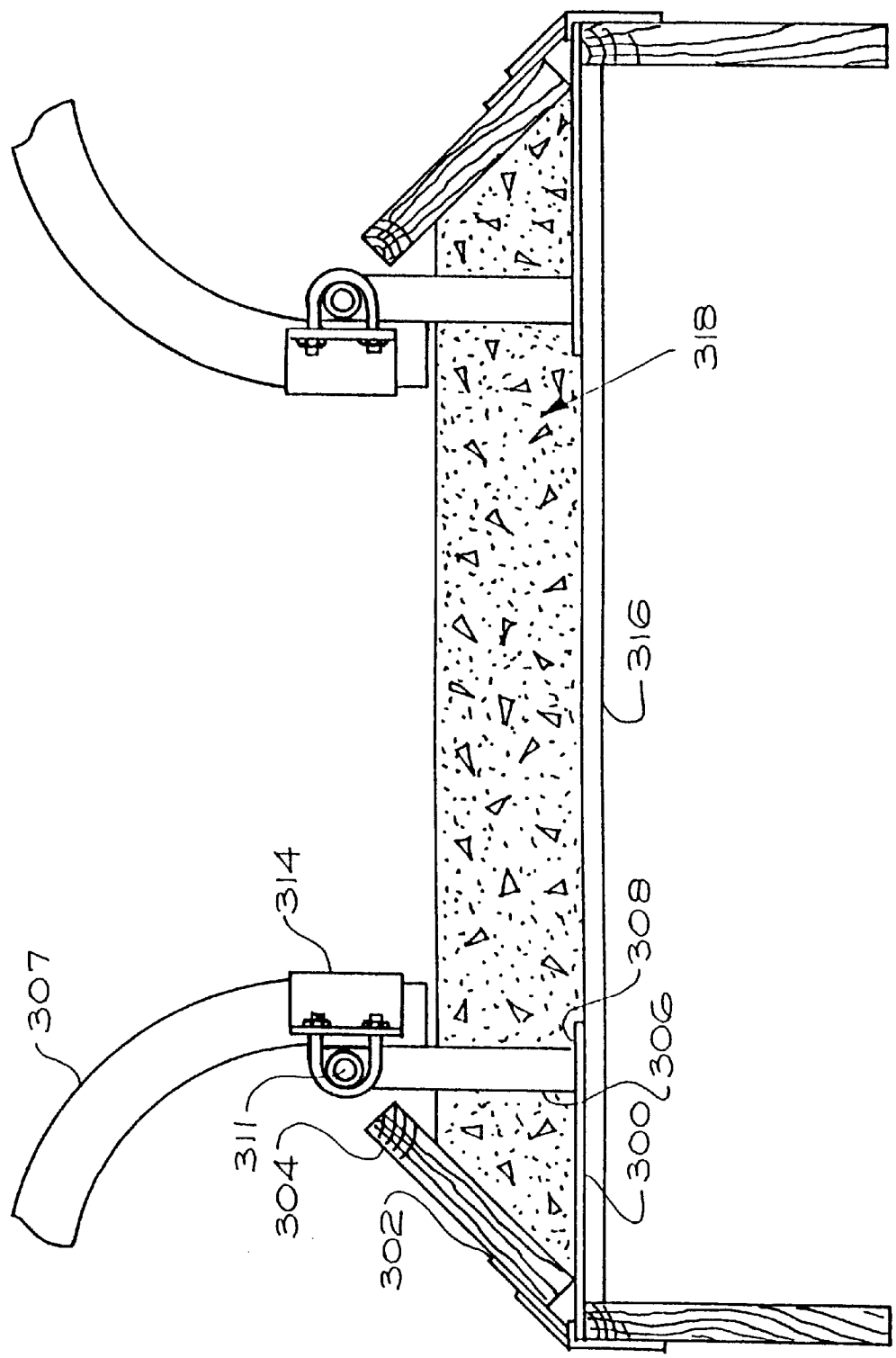

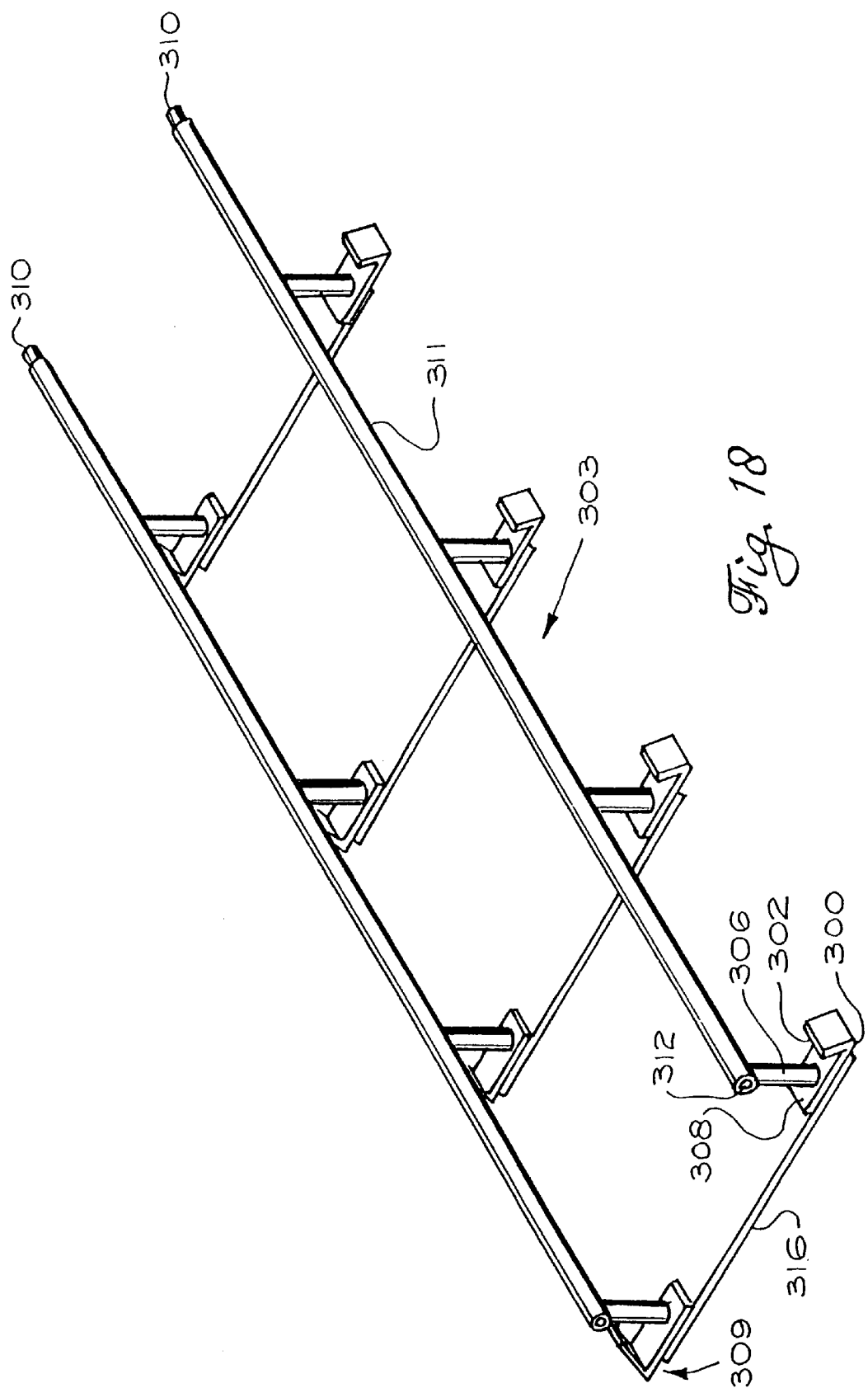

FREE STALL DIVIDER

This application is a continuation of Ser. No. 09/004,467 filed Jan. 8, 1998, now U.S. Pat. No. 5,975,026.

BACKGROUND

This invention relates generally to devices used to separate animals and, more particularly, to a free stall divider that eliminates various obstructions in each stall, thereby increasing the space available for each animal.

Free stalls, or stalls which allow animals to move freely within a limited area, are well known in the art. While effective in some circumstances, prior art free stall dividers suffer from several disadvantages. First, traditional free stall dividers must be mounted to barn structural elements such as walls, building columns, or center posts, all of which restrict animal movement in the forward direction. These restrictions make it difficult for animals, and particularly cows, to move in a natural way. When cows lie down or rise from a lying position, they naturally move forward or "lunge," and can be injured when they strike these obstructions. Second, when cows lie in a stall, they are most comfortable with their heads positioned to one side. The aforementioned structural restrictions can prevent cows from resting their heads in the most comfortable positions. This is particularly important because it has been shown that cows that live in comfortable quarters produce more milk than other cows. Third, because many of these devices depend on structural elements in the barn for mounting, the placement of the stalls is limited by the existing position of these elements in a barn. Other free stall dividers require the permanent installation of mounting members such as center posts or sockets which are cemented directly to the barn floor. Consequently, once these stalls are positioned in the barn, they are difficult or impossible to move, remove or replace. Third, these prior art free stall dividers require numerous parts, which are heavy, expensive to ship, and difficult to install. In addition, prior art free stall designs often require that two legs be cemented to the floor at opposite ends of the stall to provide structure and stabilization. Once these legs are installed, it is difficult to clean under the stalls, especially when using automatic cleaning equipment.

It is therefore an object of the invention to provide an improved free stall divider which increases the "lunge" room available to animals.

It is another object of the invention to provide an improved free stall divider which allows a cow to comfortably position its head.

It is another object of the invention to provide an improved free stall divider which is independent of barn structural elements for mounting.

It is yet another object of the invention to provide an improved free stall divider which can be readily moved within or removed from a barn.

It is still another object of the invention to provide an improved free stall divider in which parts can be easily replaced.

It is a still further object of the invention to provide an improved free stall divider which is easy to install.

It is a still further object of the invention to provide an improved free stall divider which requires fewer parts.

It is yet another object of the invention to provide an improved free stall divider which is simple in construction and less costly to ship.

It is a further object of the invention to provide an improved free stall divider which can be adapted for use in single and double row installations.

It is yet another object of the invention to provide an improved free stall which is easy to clean.

The present invention provides a free stall divider comprising a substantially horizontally extending base, at least one mounting member coupled substantially vertically to the base, and at least one dividing element including a substantially vertically extending mounting portion coupled to said one mounting member. The base provides a platform for mounting the dividing elements, thereby eliminating the necessity to mount structural elements directly to the barn floor, walls, or columns. All of the structure necessary to retain the dividing elements upright is provided by the mounting members, which are located on the base. The dividing elements act essentially like walls, and are positioned to the side of the animals in a stall. Therefore, all of the mounting members are positioned to the side of the animal, rather than in front of the animal. The space in front and to the side of the animals is therefore free of obstructions, thereby increasing the "lunge" room and providing additional room for the animals to place their heads at the side of the stall. Moreover, the majority of the free stall divider is elevated above the floor level so that it is easier to clean under than traditional free stall systems.

Furthermore, because the free stall divider of the present invention is installed independent of the barn structure, it can be readily moved or replaced. In addition, the free stall divider of the present invention can be easily disassembled, and is easier to ship than previous devices. The free stall divider of the present invention can also be adapted for use in both single and double rows of stalls, thereby decreasing the number of different parts which must be acquired when assembling a free stall system.

Other advantages and features of the invention, together with the organization and manner of operation thereof, will become apparent from the following detailed description when taken in conjunction with the accompanying drawings wherein like elements have like numerals throughout the drawings.

BRIEF DESCRIPTION OF THE DRAWINGS

FIG. 17 is a side view of the base of FIG. 16

FIG. 18 is a side view of the coupling rail of FIG. 16.

DETAILED DESCRIPTION OF THE PREFERRED EMBODIMENTS

Figure 1:
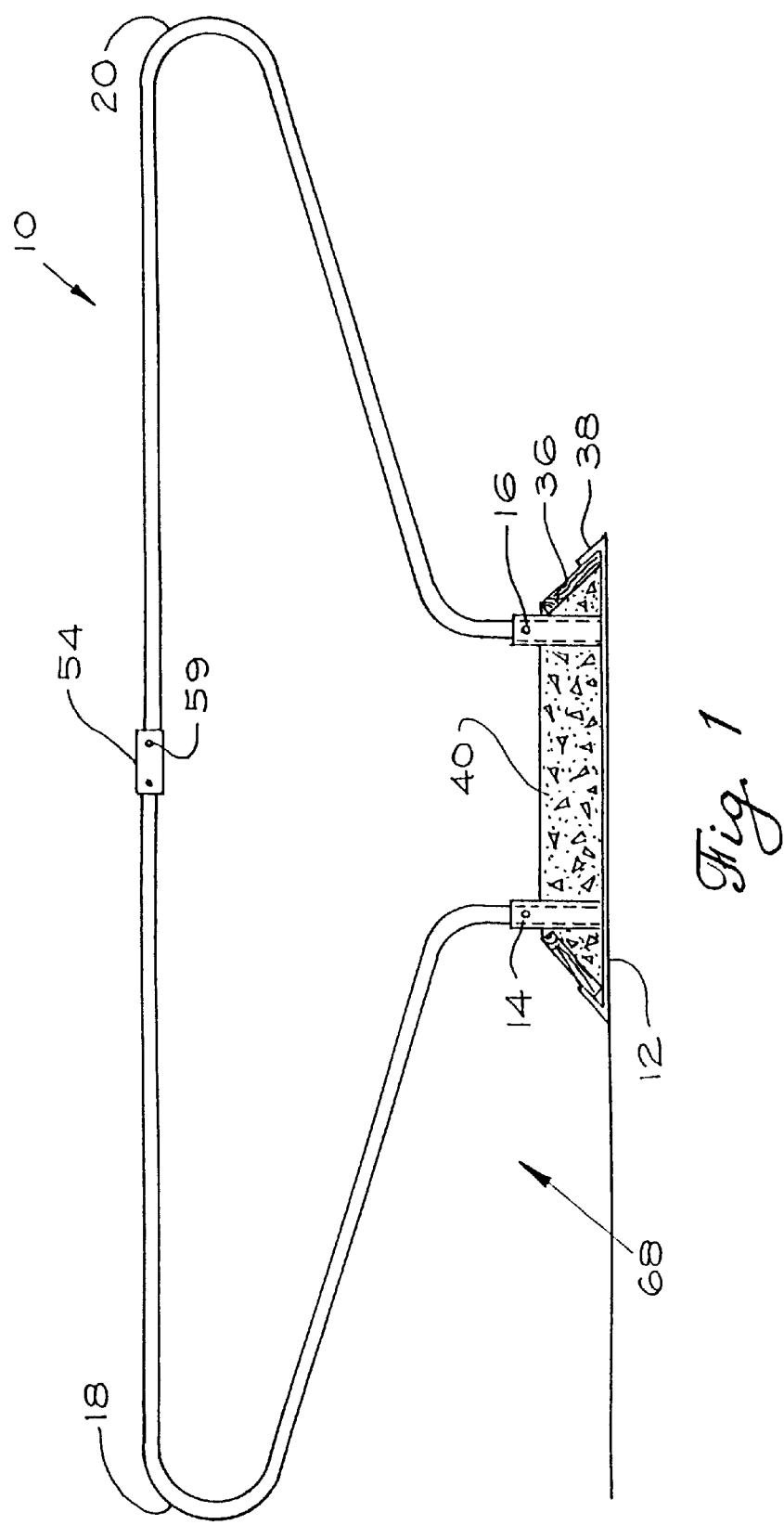
FIG. 1 is a side view of a double free stall divider constructed in accordance with the present invention.
Figure 2:
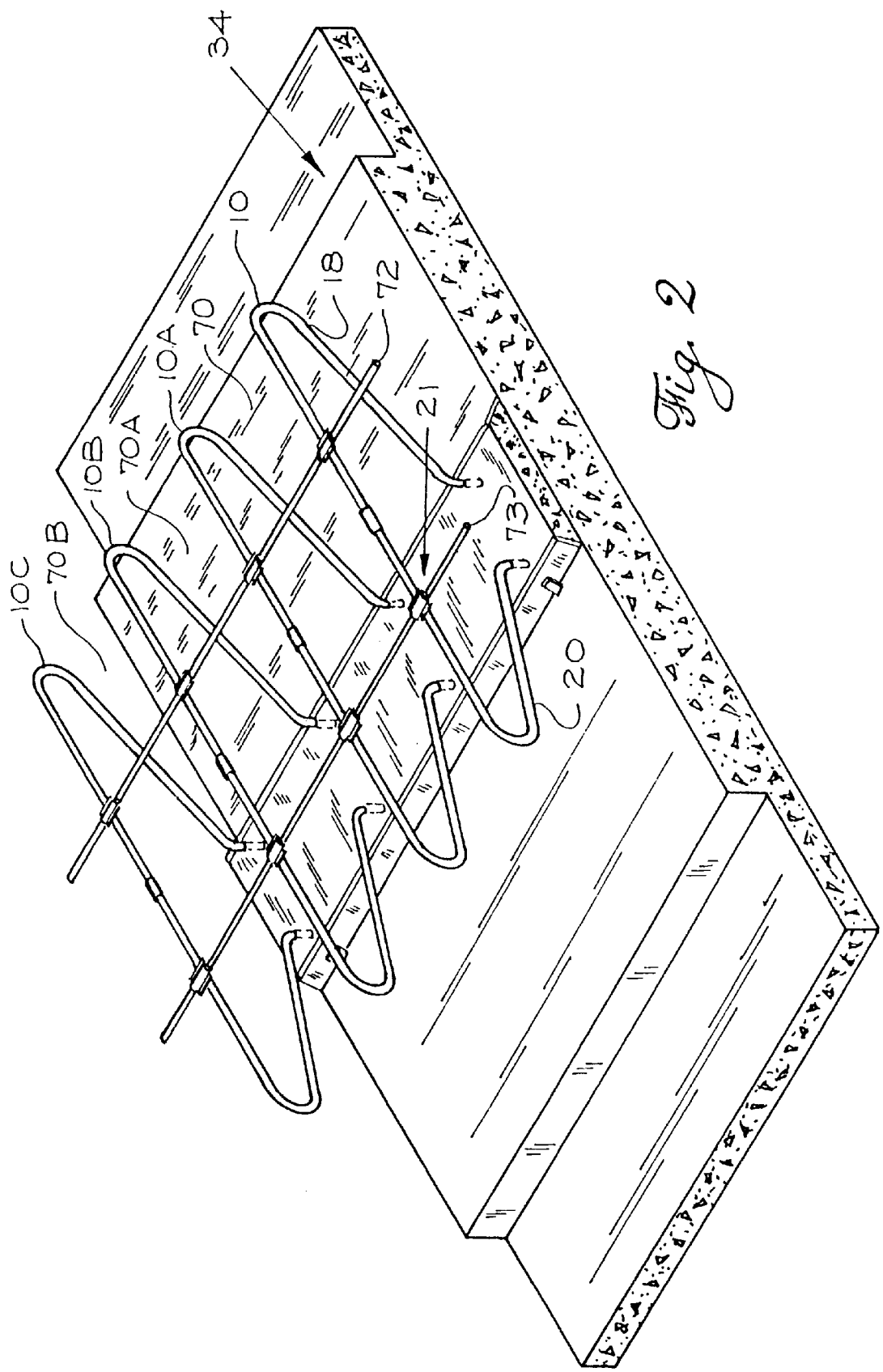
FIG. 2 is an isometric view of a series of double free stalls provided in accordance with the present invention.

Referring to the Figures, and more particularly to FIGS. 1 and 2, a free stall divider constructed in accordance with one preferred embodiment of the invention is illustrated at 10. A free stall divider is a device for dividing an open area into separate "free" stalls for animals wherein the animals are free to move, and are not locked to a stanchion. Single free stalls provide living space for a single animal, while double free stalls provide living space for two animals facing each other head-to-head. Typically, a plurality of free stalls are arranged in a substantially parallel space relationship to one another forming a free stall system which provides living space for a plurality of animals, as shown in FIG. 2.

In accordance with one preferred embodiment of the invention, each free stall divider 10 comprises five primary parts: a base 12; a pair of mounting members 14 and 16; and a pair of dividing elements 18 and 20. When assembled, the mounting members 14 and 16 are coupled preferably substantially vertically to the substantially horizontally extending base 12. The dividing elements 18 and 20 are coupled preferably substantially vertically to the mounting members 14 and 16, respectively. Together, these five primary components form a double free stall divider for separating animals wherein the dividing elements 18 and 20 act essentially like a wall between two adjacent stalls. When in the stall, the animals stand parallel to the dividing elements 18 and 20, and can face each other head-to-head. Because the dividing elements 18 and 20 are mounted only to the base 12, and require no additional mounting devices, the area 21 directly in front of the animal is not obstructed.

Figure 3:
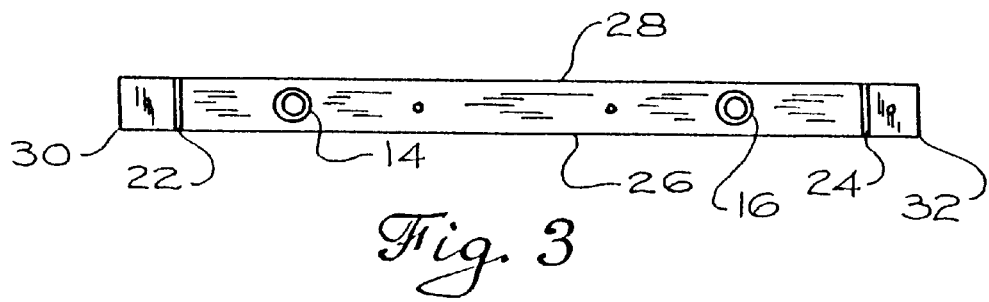
FIG. 3 is a plan view of the base shown in FIG. 1.
Figure 4:
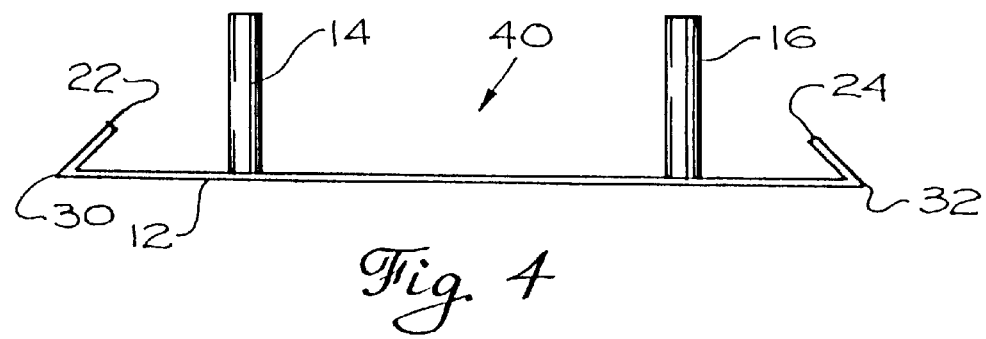
FIG. 4 is a side view of the base shown in FIG. 1.
Figure 5:
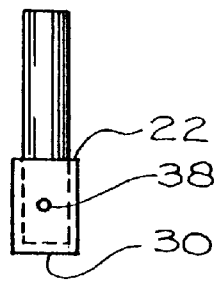
FIG. 5 is an end view of the base shown in FIG. 1.

Referring now to FIGS. 3–5, the base 12 is preferably rectangular in shape, comprising ends 22 and 24, sides 26 and 28, and bends 30 and 32. The base 12 is designed to be placed on the floor of a barn or other location, and to lie essentially parallel to the ground, preferably on a stall platform 34. The length of the base 12 from one end 22 to the other end 24 is sufficient to cover the center lunge room of the stall platform 34, as can be seen in FIG. 2.

Referring to FIG. 1, the ends 22 and 24 of the base 12 are adapted to accommodate the installation of parallel brisket boards 36. To this end, the ends 22 and 24 are bent, formed or welded upward at an angle to form the bends 30 and 32. One or more holes 38 are drilled near each end 22 and 24 to receive screws or other coupling devices for retaining the brisket boards 36 in place. The base 12 in combination with the brisket boards 36 defines a cavity 40 for receiving concrete or other moldable materials for forming a brisket. Forming the concrete brisket in the cavity 40 obviates the need for a permanent concrete brisket poured on the barn floor, and eliminates the time-consuming task of building concrete forms.

Figure 14:
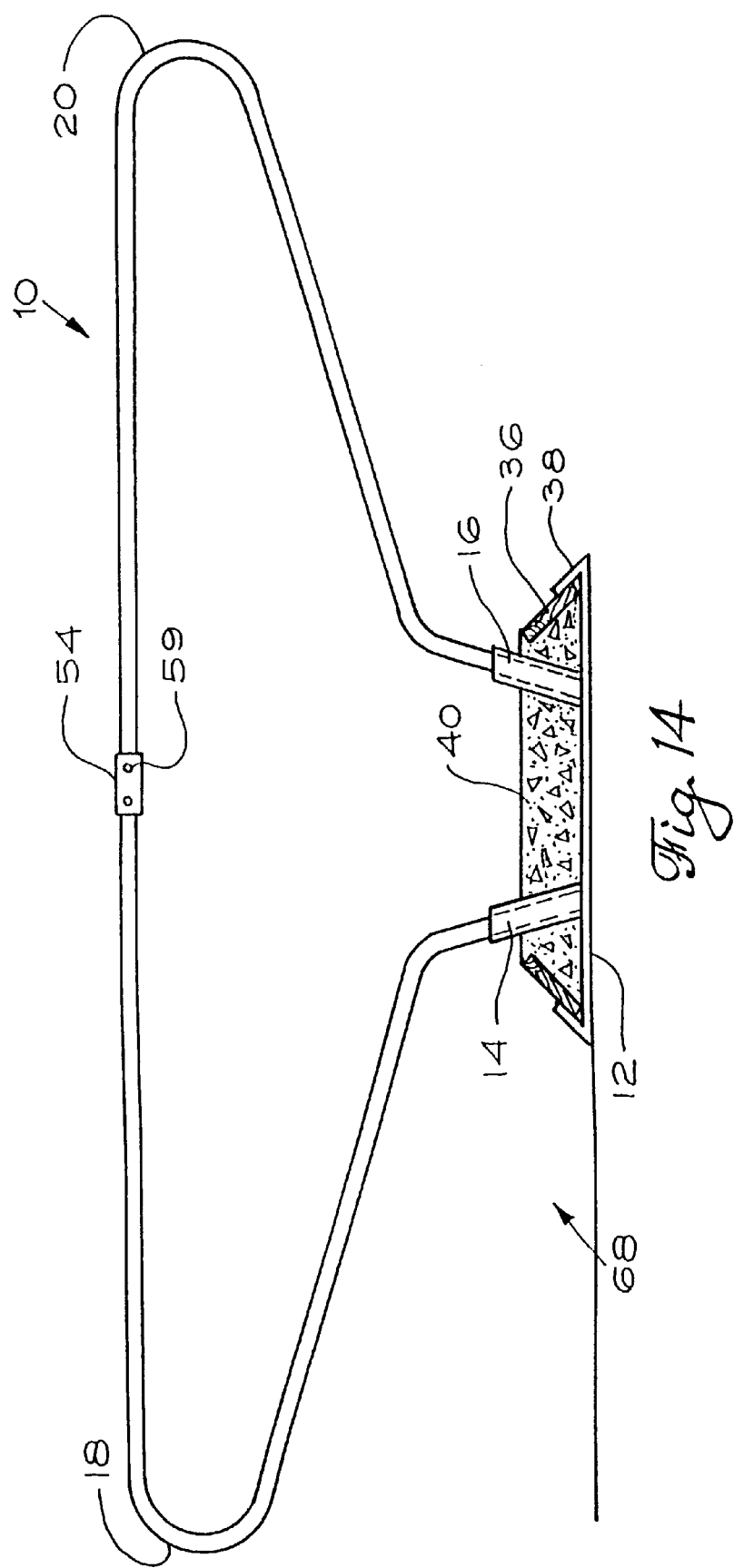
FIG. 14 illustrates a side view of an alternative embodiment of a double free stall provided in accordance with the present invention.

The mounting members 14 and 16 are preferably hollow tubular members having an inner diameter that is larger than the outer diameter of the dividing element 18 and 20, such that the mounting ends of the dividing elements 18 and 20 can be inserted into the mounting members 14 and 16 (FIG. 1). However, the mounting members 14 and 16 can be of any shape which will accommodate the dividing elements 18 and 20 of any desired shape. The mounting member 14 is positioned on the base 12 near the end 22, and the mounting member 16 is positioned on the base 12 near the opposite end 24, as can be seen in FIGS. 3 and 4. Both mounting members 14 and 16 are positioned on the base at a location substantially centered between the sides 26 and 28. The mounting members 14 and 16 preferably extend in a direction perpendicular to the base 12, but can extend in any direction which is substantially vertical, or at an angle, as can be seen in FIG. 14. The direction in which the mounting members extend is limited only by their ability to support the dividing elements 18 and 20 in a generally upright orientation. The mounting members 14 and 16 can be formed as part of the base 12, welded to the base 12, or secured by screws, bolts, or other securing devices. In addition, one or more holes 41 can be drilled in the mounting members 14 and 16 to aid in the installation of screws or other securing devices for retaining the dividing elements 18 and 20 upright. Although two mounting members 14 and 16 are shown, a plurality of pairs of mounting members can be positioned on a single base 12, thereby providing a free stall system mounted on a single base. Furthermore, a single mounting member 14 can also be used to support a divider.

Figure 7:
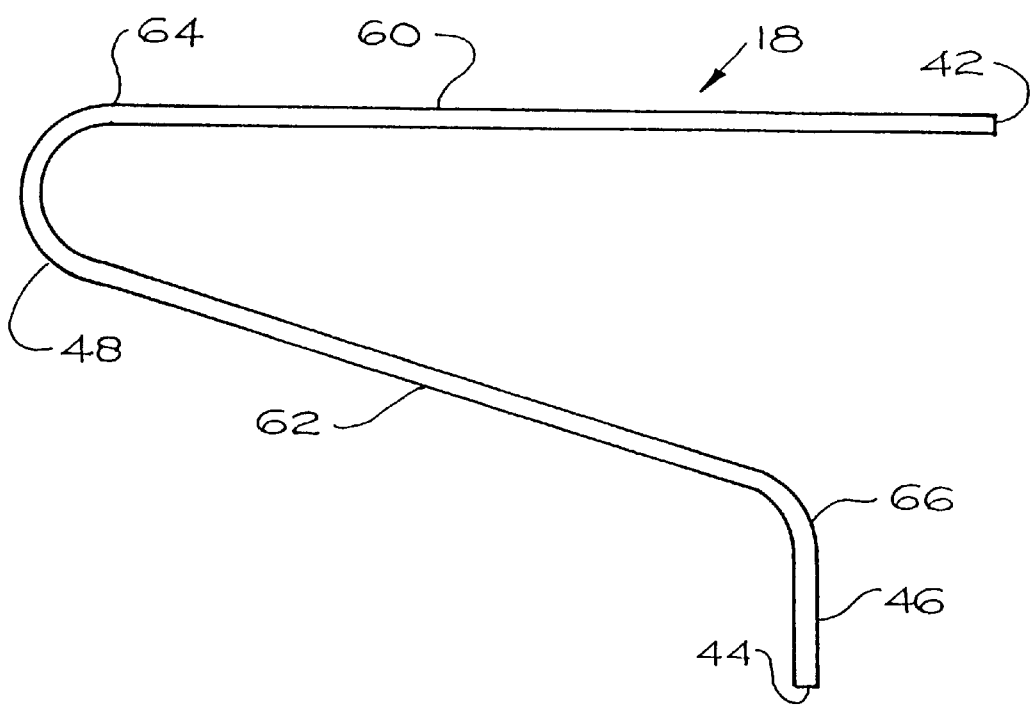
FIG. 7 is a side view of the dividing element shown in FIG. 1.

The dividing elements 18 and 20 are identical in construction, and will be described with reference to dividing element 18, shown in FIG. 7. Generally, the dividing element 18 comprises two ends, 42 and 44, wherein the end 44 comprises a substantially vertical mounting portion 46, and the end 42 provides a location for coupling a second dividing element. A joining portion 48 joins the end 42 to the mounting portion 46. Preferably, the joining portion 48 comprises horizontal and arcuate sections, but can comprise any shape which joins the ends 42 and 44 together. The dividing element 18 preferably comprises tubular metal, but can comprise other materials such as plastic, rubber, or wood.

Figure 6:
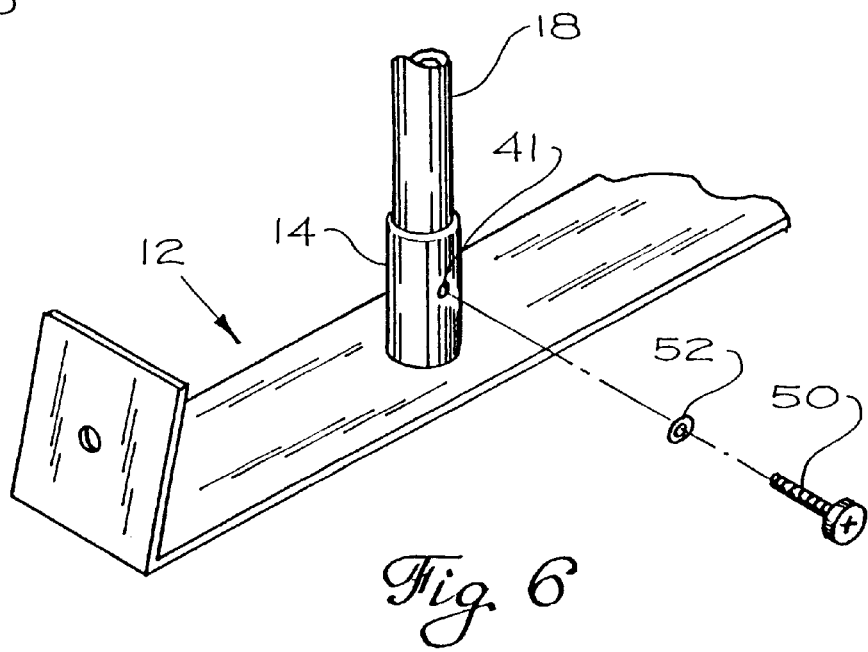
FIG. 6 is a fragmentary side view of a portion of the dividing element shown in FIG. 1 shown coupled to the mounting member shown in FIG. 1.

When assembled, the end 42 is positioned above the approximate center of the base 12. The end 44 is received by the mounting element 14. Preferably, the mounting portion 46 of the dividing element 18 is secured to the mounting member 14 with self-tapping screws 50 and, in some embodiments, neoprene gaskets 52, as is shown in FIG. 6. The self-tapping screws 50 simplify installation by eliminating the necessity to align holes located in both the mounting member 14 and the dividing element 18. However, the dividing element 18 can be welded to the mounting member 14, or secured to the mounting member with any type of screw, bolt, or other securing device or method. The joining portion 48 extends a distance horizontally from the end 42 past the first end of the base 22, while remaining vertically elevated above the ground, thereby forming an arch before joining the end 42 to the mounting portion 46.

Figure 8:
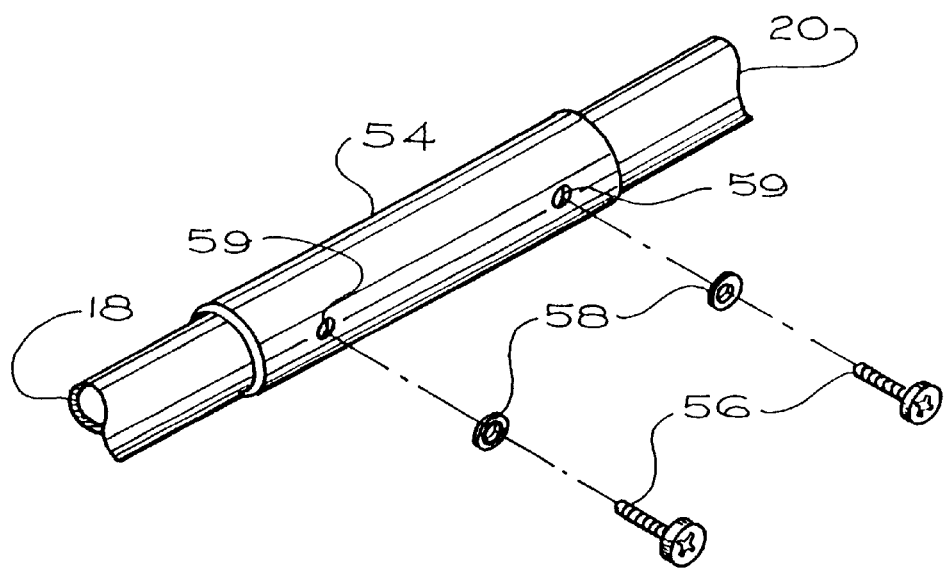
FIG. 8 is a fragmentary side view of two dividing elements shown in FIG. 1 coupled to a tubular coupling element.

As mentioned above, the dividing element 20 is constructed in an identical manner to the dividing element 18. When assembled, the dividing element 20 forms the mirror image of the dividing element 18, extending in an identical manner in the opposite direction horizontally from the center of the base 12. The dividing elements 18 and 20 preferably meet at a location that is substantially above the center of the base 12. When assembled, therefore, the two dividing elements form a loop which extends horizontally beyond both ends 22 and 24 of the base 12. The dividing elements 18 and 20 are preferably coupled together by means of a tubular coupling element 54, self-tapping screws 56, and, in some embodiments, neoprene gaskets 58, as is shown in FIG. 8.

One or more holes 59 can be drilled in the coupling element 54 to simplify the insertion of coupling devices. However, the dividing elements 18 and 20 can be welded or fastened by bolts, screws, or other coupling devices, or can form one continuous piece.

In one preferred embodiment of a free stall divider that is especially sized for cows, the joining portion 48 further comprises a substantially horizontal section 60 and an arcuate section 62 which joins the substantially horizontal section 60 to the substantially vertical mounting portion 46. One end 42 of the dividing element 18 is positioned approximately forty-four inches vertically above the center of the base. From this position, the horizontal section 60 extends horizontally from the center of the base 12 to the horizontal endpoint 64 at a location approximately seventy-eight inches horizontally and forty-two inches vertically from the center of the base 12. The mounting portion 46 is coupled to the mounting member 14, which is in turn coupled to the base 12 at a location approximately fourteen inches horizontally from the center of the base and is centered between the sides 26 and 28 of the base 12. Starting from the base 12 the mounting portion 46 extends substantially vertically to a vertical endpoint 66 at a height of approximately forty-two to forty-eight inches. The arcuate section 62 extends from the vertical endpoint 66 of the mounting portion 46 to the horizontal endpoint 64, making a 180° turn and forming an arch. Again, the dividing element 20 provides a mirror image of the dividing element 18, extending horizontally in the opposite direction. The dividing elements 18 and 20 are coupled together at a height of forty-two inches above the approximate center of the base.

In this preferred embodiment, the bends 30 and 32 in the base 12 are located approximately twenty-five inches in each direction horizontally from the center of the base 12. The horizontal section 60, however, extends to a location approximately seventy-eight inches horizontally from the center of the base 12. Therefore, approximately two-thirds of the dividing element 18 extends past the end of the base 12 while it is elevated above ground level. An open space 68 that is positioned between the arcuate section 62 and the ground simplifies cleaning, because cleaning equipment can be easily moved through the open space 68. This is particularly beneficial when automated cleaning equipment is used.

Referring again to FIG. 2, a typical a free stall system comprising a plurality of free stall dividers 10 positioned in a parallel relationship to each other is shown. The free stall dividers 10, 10A, 10B, and 10C are spaced apart a sufficient distance to form free stalls 70, 70A, and 70B. Each stall 70, 70A, and 70B provides living space for two cows facing each other head-to-head. The center portion 21 of each stall is free from structural elements, thereby providing increased lunge room over traditional free stall systems. Furthermore, because the free stall dividers 10 are substantially loop-shaped, the side of each stall 70, 70A, and 70B is substantially free from structural elements. The open area within each loop provides a head rest area 23 for the cow to rest its head when in a lying position. The increased lunge room of the invention coupled with the loop's open area can allow the cow to stand up from the lying position with its head to the side. In this embodiment, cross bars 72 and 73 extend substantially perpendicular to the dividing elements 18 and 20 and interconnect the horizontal sections 60 of adjacent free stall dividers 10 to provide additional stability to the free stall system. The height of cross bars 72 and 73 is sufficient to allow the cow to lunge forward without touching cross bars 72 and 73.

Figure 13:
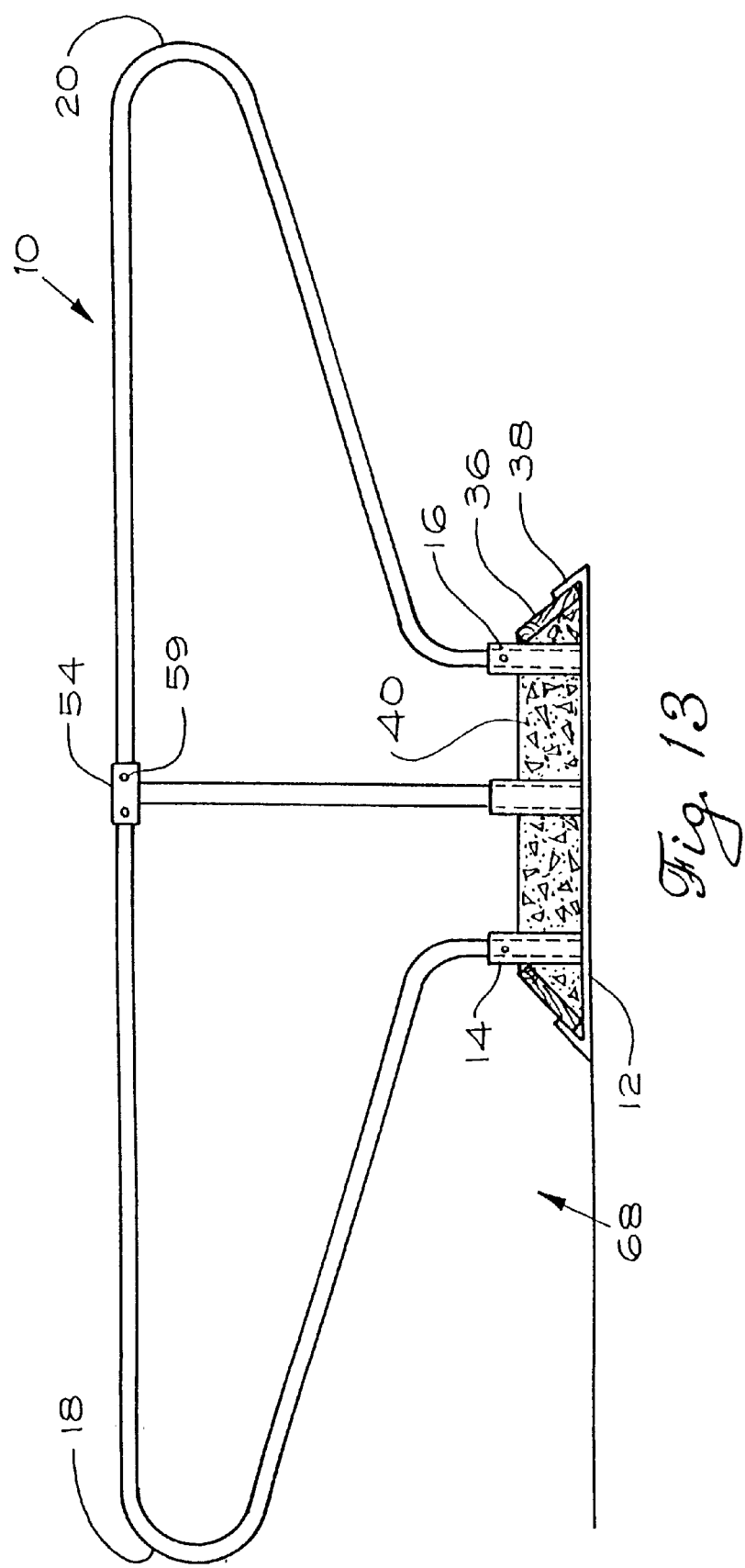
FIG. 13 illustrates a side view of an alternative embodiment of a double free stall provided in accordance with the present invention.

In another embodiment, shown in FIG. 13, a center dividing element 19 is coupled to an additional mounting member 15 which is generally centered on the base 12. The center dividing element 19 extends substantially vertically from the mounting member 15 and is coupled to the dividing members 18 and 20 at a location substantially centered above the base 12. The center dividing element 19 can be coupled to either member 18 or 20 or to the tubular coupling element 54. While this embodiment does not afford the lunge and head room advantages of the embodiment of FIG. 1, this embodiment provides all of the same advantages with respect to ease of installation and cleaning. In addition, the center dividing member 19 provides an advantage in that it prevents animals from becoming entangled under the free stall divider. While in FIG. 13, the center dividing element 19 is shown extending from the mounting member 15 to the tubular coupling elements 54, it is understood that the center dividing element 19 can extend only a portion of the distance between the mounting member 15 and the tubular coupling element 54. Furthermore, the center dividing element 19 can extend downward from the tubular coupling element 54 toward the base, or form an integral part of the dividing element 18 or 20.

In another preferred embodiment, the dividing element 20 is replaced by a structural element which extends horizontally to a position above the mounting member 16, and then makes approximately a 90° turn. The structural element, therefore, does not extend horizontally beyond the base 12 to function as a dividing element between animals, but rather serves as a structural element to maintain the dividing element 18 upright. In this embodiment, therefore, a single stall is formed.

Figure 9:
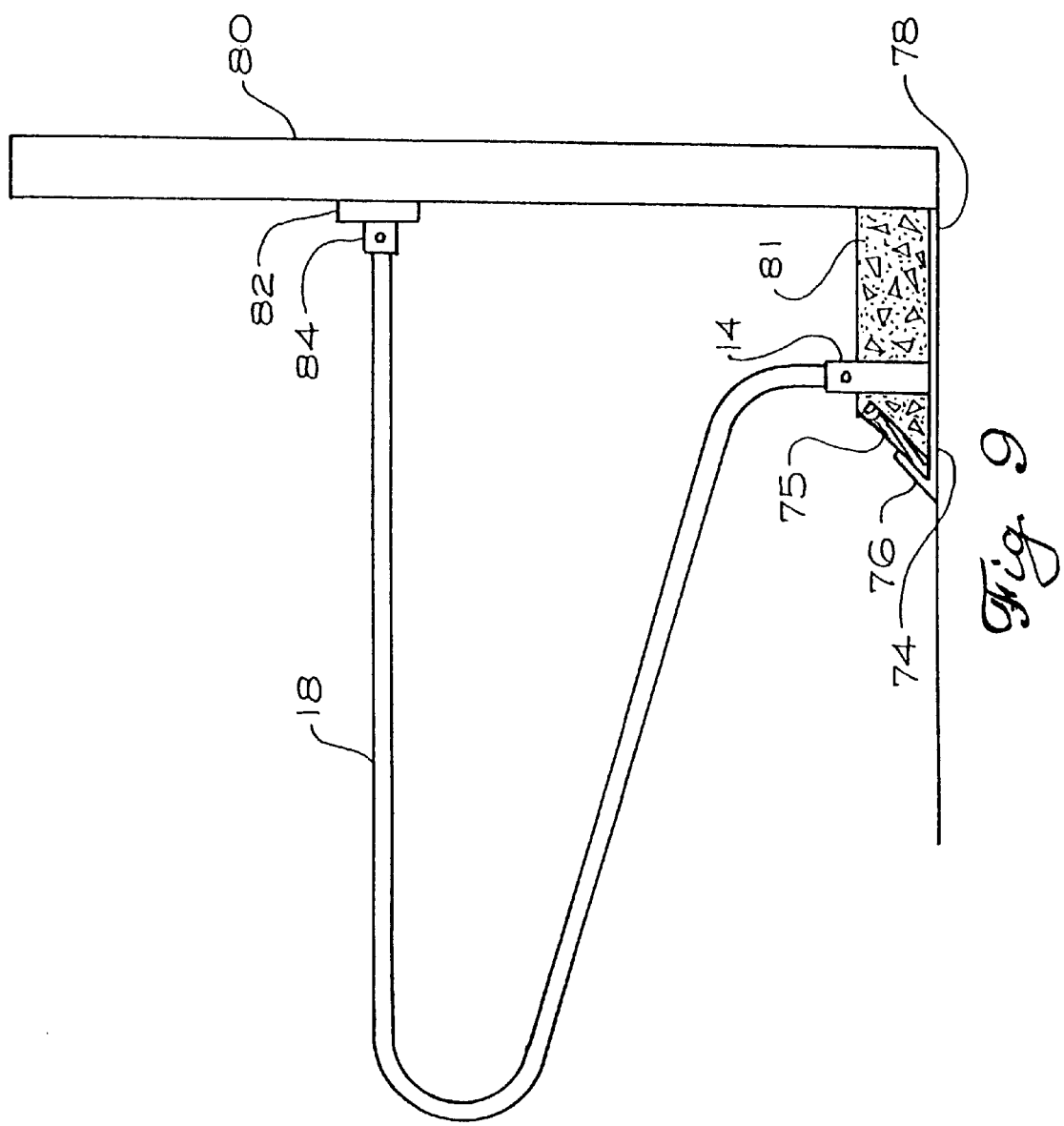
FIG. 9 illustrates a side view of a single free stall constructed in accordance with the present invention.

In another preferred embodiment shown in FIG. 9, the free stall of the present invention is configured to provide a single stall which can be mounted to a center post or wall, in the manner of traditional free stalls, but which is constructed using one or more of the dividing elements 18 and 20 that are used to form the double free stall. In this embodiment, the free stall comprises a base 74, a single mounting member 14, and a dividing element 18. The base 74 is preferably rectangular, comprising two ends 76 and 78. The mounting member 14 is coupled to the base in a position near one end 76. The end 76 of the base 74 is preferably adapted to receive a brisket board 75. The other end 78 preferably abuts a wall or column 80 of the barn. The base, in conjunction with the brisket board 75 and the wall or column 80, defines a cavity 81 in which concrete or other moldable material can be received for forming a brisket. A dividing element 18, is coupled to the mounting member 14. A square tube 82 and tubular coupling device 84 is preferably mounted to the wall or barn column 80 to removably receive the end 42 of the dividing element 18. However, the end 42 can be welded to the coupling device 84, or fastened with bolts, screws or other fastening devices.

Figure 10A:
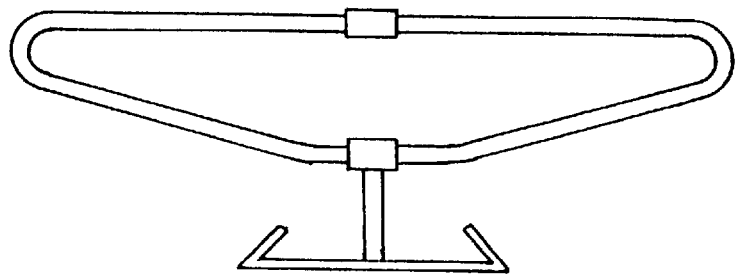
FIG. 10A illustrates a side view of an alternative embodiment of a double free stall provided in accordance with the present invention.
Figure 10B:
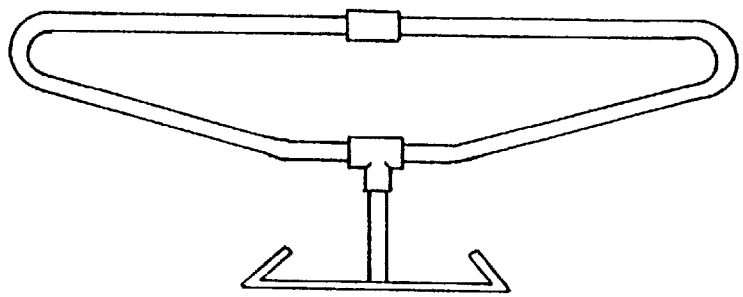
FIG. 10B illustrates a side view of an alternative embodiment of a double free stall provided in accordance with the present invention.

Two alternative embodiments, shown in FIGS. 10A and 10B, comprise basically the same primary parts as the embodiment shown in FIG. 1. However, in the alternative embodiments, the dividing elements 18 and 20 are coupled to the mounting member 90 in a different way. In the same manner as the embodiment of FIG. 1, the dividing elements 18 and 20 include a first end, 42, a second end 44, and a joining portion 48 which joins the first end 42 to the second end 44. In these embodiments, however, a substantially horizontal mounting portion 86 is substituted for the substantially vertical mounting portion 46 on each of the dividing elements 18 and 20. The substantially horizontal mounting portions 86 of the two dividing elements meet at a location substantially above the center of the base 12, and are coupled together by a second tubular coupling element 88. The tubular coupling element 88 is then coupled to the mounting member 90, as shown is FIGS. 10 and 11. The tubular coupling element 88 can form a continuous substantially T-shaped bracket, as is seen in FIG. 10B. Alternatively, the tubular coupling element 88 can be welded or otherwise connected, as is shown in FIG. 10A. The substantially horizontal mounting portions 86 are removably coupled to neoprene gaskets 52, as described above. Alternatively, the mounting portions 86 can be welded to the tubular coupling element 88 or coupled in other known ways.

Figure 11:
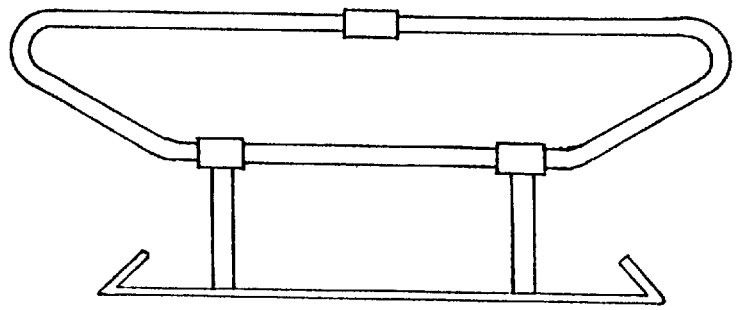
FIG. 11 illustrates a side view of an alternative embodiment of a double free stall provided in accordance with the present invention.

Another alternative embodiment is shown in FIG. 11. In this embodiment, the free stall divider comprises a base 12, mounting elements 14 and 16, dividing elements 18 and 20, first, second, and third tubular coupling elements 100, 102, 104, and a divider joining member 106 which completes the loop between the first dividing elements 18 and second dividing elements 20. In this embodiment, the first ends 42 of each dividing elements meet in a position substantially above the center of the base 12 and are coupled together with the first tubular coupling element 100, one or more self-tapping screw, 50, and, in some applications, neoprene gaskets 52.

The mounting members 14 and 16 are positioned on the base 12 in positions substantially equidistant from the center of the base 12. The second end 44 of each dividing element 18 and 20 is inserted into a tubular coupling element 102 and 104, respectively. The divider joining member 106 is inserted into the opposite end of each coupling element 102 and 104, and extends in a substantially horizontal direction above the base 12. The mounting members 14 and 16 are coupled to the tubular coupling elements by self-tapping screws 50 and neoprene gaskets 52, as described above, or can be welded or coupled in other known ways. In some applications, the tubular coupling elements 102 and 104 can be substantially T-shaped, as is shown in FIG. 10B.

Figure 12:
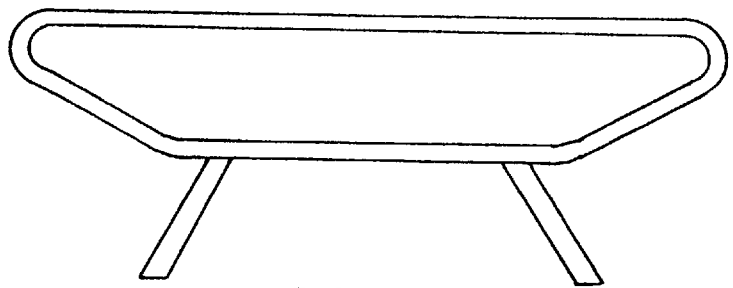
FIG. 12 illustrates a side view of an alternative embodiment of a double free stall provided in accordance with the present invention.

Another preferred embodiment is shown in FIG. 12. In this embodiment, the dividing elements 18 and 20 and associated tubular coupling element are replaced by a continuous tubular loop 92. Two mounting members 14 and 16 extend from the lower horizontally extending portion 94 of the loop 92. These mounting members 14 and 16 are coupled to the continuous tubular loop 92 through welds or other known coupling methods. The mounting members 14 and 16 can extend in a substantially perpendicular direction to the horizontally extending portion 94 of the loop 92 or call extend at an angle as shown in FIG. 12. In other cases, the continuous loop 92 and mounting members 14 and 16 can form one continuous loop. While the continuous loop 92 is shown coupled directly to mounting members, it is apparent that the continuous loop can be coupled to mounting members with tubular coupling elements or other devices. Furthermore, it is also apparent that the mounting members can be coupled to a base 12 as described above.

Figure 15:
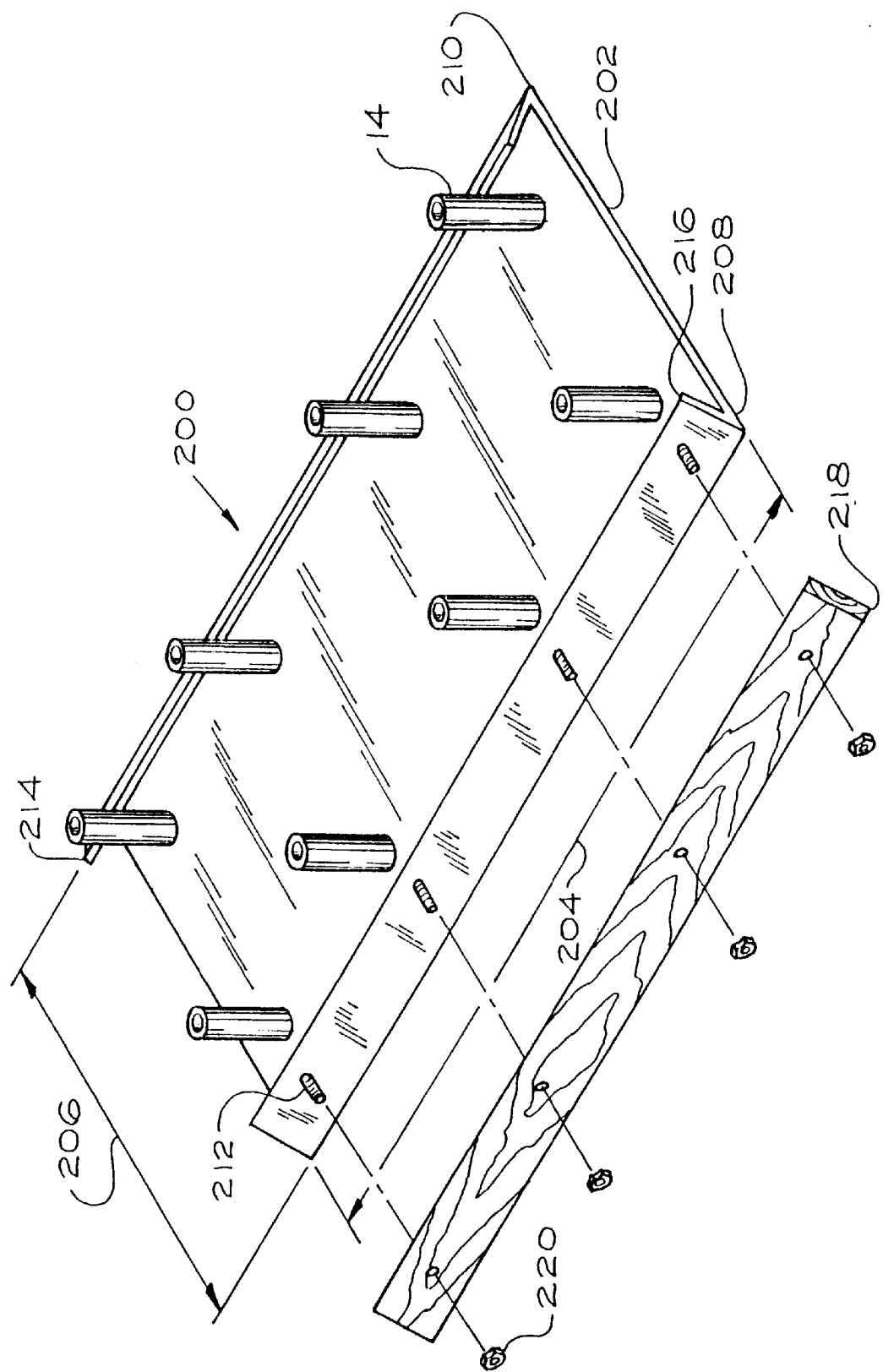
FIG. 15 illustrates a plan view of an alternative embodiment of the base shown in FIG. 1.

An alternative embodiment of the free stall 10, particularly useful for easily installing a series of parallel free stalls 10 in a single location, includes a base 200 for mounting a plurality of free stalls in a parallel space relationship. A base 200 for this alternative embodiment is shown in FIG. 15. The base 200 comprises a plurality of mounting members 14 coupled to a generally rectangular base plate 202, the length 204 of which extends the width of a plurality of free stalls 10. The mounting members 14 are coupled to the base in opposed pairs, across the width of the base 206. Preferably, the ends 214 and 216 of the base plate 202 are bent upward at an angle to form bends 208 and 210. Threaded studs 212 are coupled near the ends 214 and 216 and along the entire length 204 of the base plate 202. The threaded studs 212 accommodate the installation of brisket boards 218. Preferably, holes dimensioned to receive the threaded studs are drilled into the brisket boards 218. Each brisket board 218 is then positioned over the threaded studs 212 and locked into place by a matching washer and nut or other coupling device 220. While the base plate 202 is shown to comprise a single piece with bends at opposing ends, the ends 214 and 216 could comprise an additional piece coupled or welded to the base plate. Furthermore, it will be apparent that a similar result could be achieved by welding or otherwise coupling a series of bases 12 to a single base plate 202.

Figure 16:
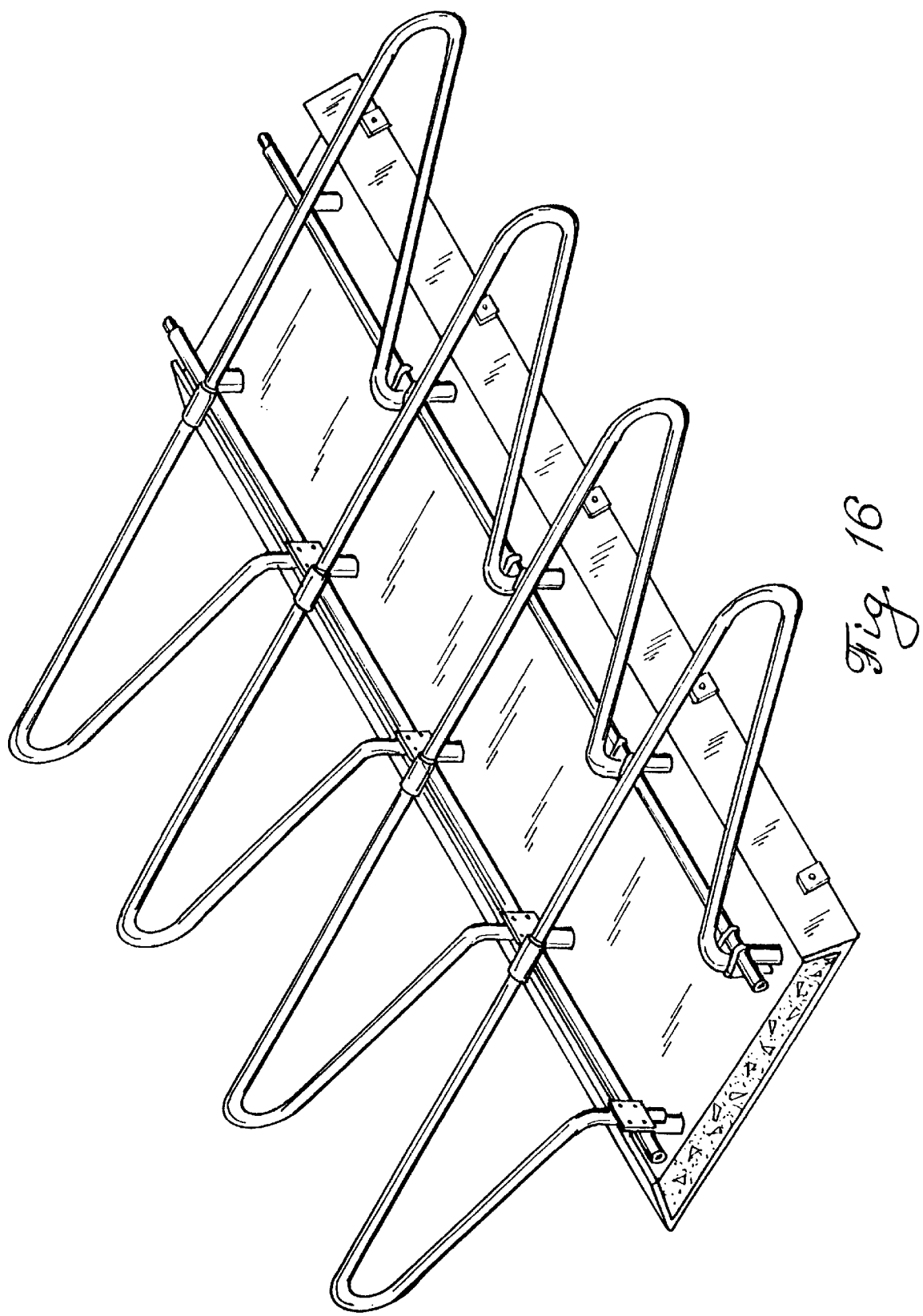
FIG. 16 illustrates an isometric view of a rail mount free stall system in accordance with the present invention.

Another embodiment, particularly useful for providing an easy-to-install free stall divider system 301 in which the width of each independent free stall can be easily varied to accommodate different sizes and types of cows is shown in FIGS. 16–18. To provide double free stalls, as shown, the free stall system 301 comprises at least two rail mounting systems 303, shown in FIG. 18, along with a plurality of dividing elements 307, as shown in FIG. 16. Each rail mounting system comprises at least one coupling rail 311 and a plurality of base units 309. The plurality of dividing elements 307 are removably coupled to the coupling rails 311 to separate an open area into stalls.

Each base unit 309 comprises a base plate 300 and a mounting member 306. The base plates 300 are generally rectangular, and one end 302 of each base plate 300 is bent, formed or welded upward to accommodate the installation of a brisket board 304, as shown in FIG. 17. The mounting member 306 is coupled to each base plate 300 near the end 308 directly opposite the end 302. Preferably, the mounting member 306 is welded to the base plate 300, but the mounting member may be couple in other conventional ways. One or more holes may be drilled near the end 302 to receive screws or coupling devices for retaining the brisket boards, as described with reference to base 12 above.

To form the free stall system 301, a plurality of base units 309 are arranged in a parallel space relationship with the ends 302 aligned on one side, and the ends 308 aligned on the opposite side. The coupling rail 311, which is preferably tubular in shape, is coupled to each mounting member 306, at a height slightly greater than the height of the installed brisket board 304, thereby forming a rail mounting system 303. The outer diameter of one end 310 of the coupling rail 311 is preferably of a reduced diameter relative to the opposite end 312. This difference in outside diameters allows the end 310 from one rail mounting system 303 to be slid onto the end 312 of a second rail mounting system 303, thereby simplifying multiple installations.

To form the free stall system 301, first and second rail mounting systems 303 are positioned substantially parallel to each other, with the ends 302 of the two rail mounting systems pointing away from each other, and the ends 306 pointing toward each other. Preferably, the base units 300 are positioned at opposite ends of a plate comprising rebar 316 or other materials, such that a cavity is formed for concrete 318 between the two ends 302 as shown in FIG. 17 and corresponding brisket boards 304. The dividing members 307 are substantially similar in shape to the dividing members 18 and 20 described above, but are removably coupled to the coupling rail 311 with a clamp 314. Preferably, the clamp 314 is a U-shaped clamp, but any suitable clamp can be used. The dividing members 307, therefore, can be clamped into position anywhere along the coupling rail 311. This is particularly important because different types of cows can require particular spacing. For example, most Jersey cows require a stall of only about forty inches in width, while Holsteins can require as much as forty-eight inches. In some embodiments, the clamp 314 can also be used to raise or lower the height of the dividing member 307.

While the free stall system 301 is shown as a double free stall, it is apparent that a single free stall could also be provided in a similar way. Furthermore, it is apparent that single base units including two mounting members and two ends adapted to receive brisket boards can be used in place of the single base units 309. Although many of the embodiments are shown only in side views, in the most preferred embodiments, the dividing elements are in a planar space relationship similar to the embodiment shown in FIG. 2. However, in some cases, portions of the dividing elements can be bent toward one another if desired. Furthermore, it will be apparent that any of the bases, mounting members and dividing elements shown can be interchanged with any other bases, mounting members or dividing elements shown to provide a variety of free stalls.

While preferred embodiments have been illustrated and described, it should be understood that changes and modifications can be made thereto without departing from the invention in its broader aspects. Various features of the invention are defined in the following claims.

We claim:

1. A free stall divider for dividing an open area beside a wall into a stall for an animal, comprising:
    a substantially horizontally extending base substantially aligned with a head space for the head of a resting animal;
    a mounting member positioned substantially vertically on said base; and
    a dividing element having a first end defining a mounting portion coupled to said mounting member, said dividing element extending along a stall space for the body of an animal, said dividing element also having a second end secured to said wall.

2. The free stall divider of claim 1, wherein said mounting portion of said dividing element is removably coupled to said mounting member.

3. The free stall divider of claim 1, further comprising a self-tapping screw, wherein said mounting portion of said dividing element is removably coupled to said mounting member with said self-tapping screw.

4. The free stall divider of claim 1, wherein said mounting member comprises a tubular socket to which said mounting portion of said dividing element is removably coupled.

5. The free stall divider of claim 1, wherein said dividing element further comprises a joining portion, said second end being located above said base, and said joining portion joining said second end to said mounting portion.

6. The free stall divider of claim 5, wherein said joining element comprises a substantially horizontal section and an arcuate section, said horizontal section extending vertically above and horizontally beyond an end of said base, and said arcuate section joining said horizontal section to said mounting portion.

7. The free stall divider of claim 1, wherein said mounting member is welded to said base.

8. The free stall divider of claim 1, wherein said mounting member is removably coupled to said base.

9. The free stall divider of claim 1, wherein said mounting member is formed integrally with said base.

10. The free stall divider of claim 1, wherein said mounting portion extends substantially vertically to said base.

11. The free stall divider of claim 1, comprising first and second mounting members and first and second dividing elements, each dividing element having a first end defining a mounting portion and a second end, wherein the first end of each dividing element is coupled to a respective mounting member and wherein said second end of each dividing element is coupled to the wall, said first and second dividing elements being separated a distance to define said stall space for an animal.

12. The free stall divider of claim 11, wherein said first end of each said element is removably coupled to the respective mounting member with at least a self-tapping screw.

13. The free stall divider of claim 11, wherein said second end of each said dividing element is removably coupled to the wall.

14. A method for dividing an open area into separate free stalls for animals comprising:
    providing a base substantially aligned with a head space for the heads of two facing resting animals;
    positioning first and second substantially vertically extending mounting elements on said base;
    coupling first and second dividing elements to said first and second mounting elements, respectively, said first and second dividing elements extending away from each other and away from said head space; and
    coupling said first and second dividing elements to each other to form a continuous loop.

15. The method as claimed in claim 14, wherein said first and second dividing elements are removably coupled to said first and second mounting elements, respectively.

16. The method as claimed in claim 16, wherein said first and second dividing elements are releasably coupled to one another.

17. The method as claimed in claim 14, wherein said first and second dividing elements are releasably coupled to one another.

18. The method as claimed in claim 14, wherein said base is coupled to a brisket having an elevated surface for the heads of two facing resting animals.

19. The method as claimed in claim 14, further comprising the steps of:
    repeating the providing, positioning, and both coupling steps for third and fourth mounting elements on a second base also substantially aligned with said head space and for third and fourth dividing elements coupled to said third and fourth mounting elements, respectively, thereby defining a pair of stall spaces for two facing animals sharing the head space.

20. The method as claimed in claim 14, wherein said first and second dividing elements each have a first end coupled to a corresponding mounting element, a second end coupled to a corresponding dividing element, and a joining portion running between said first and second ends, each said joining portion having a substantially horizontal portion and a substantially arcuate portion located beyond an end of said base.

21. A method for dividing an open area along a wall into a free stall for an animal, comprising the steps of:
    providing a base having a mounting element thereon;
    coupling a first end of a dividing element to the mounting element on the base, the dividing element extending rearwardly alongside the free stall from a head space for the head of an animal; and
    securing a second end of the dividing element to the wall in a position at the head space located higher than the first end of the dividing element.

22. The method as claimed in claim 21, wherein the dividing element is releasably secured to the wall.

23. The method as claimed in claim 22, wherein the dividing element is releasably coupled to the mounting element.

24. The method as claimed in claim 21, wherein the dividing element is releasably coupled to the mounting element.

25. The method as claimed in claim 21, further comprising the step of repeating the coupling and securing steps for a second mounting element on a second base and a second dividing element coupled thereto and to the wall, thereby defining a free stall between the dividing elements.

26. The method as claimed in claim 21, wherein the base is coupled to a brisket having an elevated surface for the head of a resting animal.

* * * * *